US008757630B2

(12) United States Patent
Gai

(10) Patent No.: US 8,757,630 B2

(45) Date of Patent: Jun. 24, 2014

(54) WATERPROOFING DEVICE FOR AN ACTUATOR

(75) Inventor: Giorgio Gai, Genoa (IT)

(73) Assignee: Ultraflex S.p.A., Busalla, Genoa (IT)

( * ) Notice: Subject to any disclaimer, the term of this patent is extended or adjusted under 35 U.S.C. 154(b) by 392 days.

(21) Appl. No.: 13/238,163

(22) Filed: Sep. 21, 2011

(65) Prior Publication Data

US 2012/0080850 A1 Apr. 5, 2012

(30) Foreign Application Priority Data

Sep. 30, 2010 (IT) ............................. GE2010A0109

(51) Int. Cl.
*F16J 9/00* (2006.01)

(52) U.S. Cl.
USPC ........................................................ 277/345

(58) Field of Classification Search
CPC ................................ F16J 3/042; F16F 9/0454
USPC .................. 277/634–635, 636, 345; 267/122, 267/64.19, 64.23, 64.27; 92/87, 169.4; 464/173, 174, 175
See application file for complete search history.

(56) References Cited

U.S. PATENT DOCUMENTS

| | | | | |
|---|---|---|---|---|
| 2,823,915 | A * | 2/1958 | Bourcier De Carbon | 267/227 |
| 5,308,091 | A * | 5/1994 | Mihalcin | 277/636 |
| 5,655,778 | A * | 8/1997 | Cavanaugh | 277/315 |
| 2007/0087847 | A1 | 4/2007 | Patrascu et al. | |
| 2009/0190994 | A1* | 7/2009 | Hey et al. | 403/51 |

FOREIGN PATENT DOCUMENTS

FR 2578934 A1 9/1986

* cited by examiner

*Primary Examiner* — Vishal Patel
*Assistant Examiner* — Nathan Cumar
(74) *Attorney, Agent, or Firm* — Themis Law

(57) ABSTRACT

A device for sealing an actuator includes a drive shaft and an elongated body, which move, relatively to each other, along their longitudinal axis, covered by a sleeve, which covers at least partially both the elongated body and the drive shaft, the sleeve having a first portion conformed with the bellows and a second portion having the shape like the elongated body so that it may be fitted on it and blocked at its end, the bellows portion being positioned in correspondence of the shaft and locked on it at its end so that the sleeve is integral with the shaft.

4 Claims, 1 Drawing Sheet

WATERPROOFING DEVICE FOR AN ACTUATOR

FIELD OF THE INVENTION

This invention relates to a device to seal an actuator. In particular, this invention relates to a device for sealing an actuator, for example, a hydraulic or electro-mechanical actuator of the type having an axially movable elongated element.

BACKGROUND OF THE INVENTION

It is well known that actuators normally have moving parts, which with their movement, determine the operation of mechanical devices such as levers, gears, cams or whatsoever. The movement of the actuator is usually given by an elongated element which is moved axially. For example, the elongated element can be a rod which is the stem of an electro-mechanical or hydraulic piston that moves within a corresponding cylinder.

One of the most important problems in these types of actuators is the sealing between the fixed part (the cylinder) and mobile one (the rod). Indeed, in humid environments, such as, for example, marine environments, where the actuators are immersed in water, it is possible that in the gaps inevitably present between the two parts named above, moisture and/or impurities can penetrate which damage, often in a short time, the operation of the actuator. Attempts have been made, to remedy that problem by covering both parts with a bellows. However, these do not prevent the entering of water and do not adequately protect the piston rod so that the problem is not suitably resolved.

SUMMARY OF THE INVENTION

The aim of this invention is to overcome the, aforementioned drawbacks by means of a device for sealing an actuator having the characteristics described hereinafter.

The bellows that is the subject of this invention makes the actuator watertight by applying two clamps at the ends that prevent the entering of water or impurities; it also electrically isolates the cylinder and the rod from the surrounding environment thus avoiding the aggression of galvanic currents and protects the rod by retaining its lubrication.

DETAILED DESCRIPTION OF THE DRAWINGS

The characteristics and advantages of the device according to this invention will be more apparent from the following description of its typical implementation, as an example but not limited to, referring to the attached figures which illustrate in particular:

DETAILED DESCRIPTION

Figure 1:
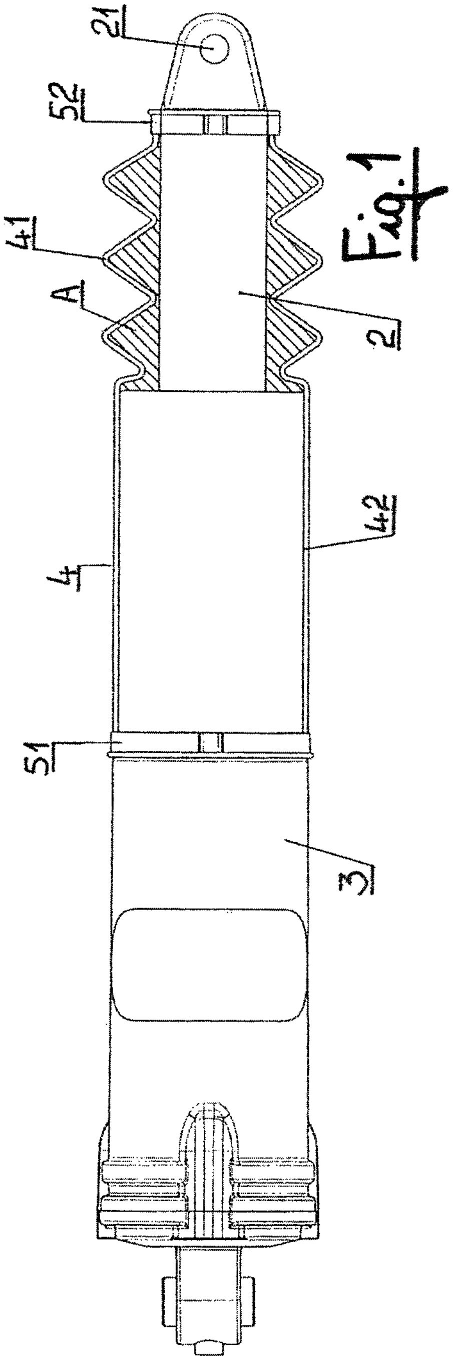
FIG. 1 shows the device according to this invention positioned on an actuator in an open position.

With reference to the above mentioned figures, the, actuator, according to this invention, includes a drive shaft 2 and an elongated body 3, for example cylindrical, which move relatively to each other along their longitudinal axis.

It is said that the actuator is in the open position when the drive shaft comes out by a predetermined portion of the elongated body.

Instead, it is said that the actuator is in the closed position when the drive shaft is retracted within the elongated body 3 and only a small portion of it extends outside the elongated body.

As an example, the shaft has at its free end (the one that is not inside the elongated body) an eyelet or hook 21 which can be used to operate devices that the actuator must activate.

According to this invention, the sealing device for such an actuator includes a sleeve 4 that at least partially covers both the elongated body and the drive shaft and has a portion that conforms with the bellows 41 and a second portion 42 having a shape that is complementary to that of the elongated body, in such way that it can be fitted on it. The second portion is fitted on the elongated body 3 and is blocked on it at its end, with a first clamp 51 that makes it integral with the body 3. The bellows portion 41 is positioned on the shaft 2 and is locked on it, at its end, by means of a second clamp 52 which makes the sleeve integral with it as well.

Figure 2:
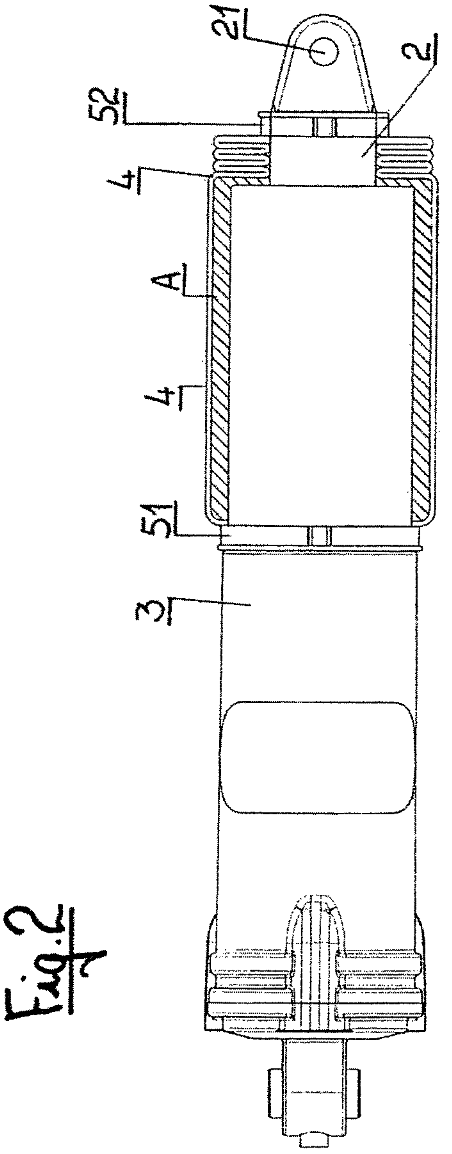
FIG. 2 shows the device according to this invention positioned on an actuator in a closed position.

During the movement of the actuator the bellows is compressed or extended. When it is in the extended position, which corresponds to the position of the open actuator, the second portion of the sleeve substantially adheres to the elongated body 3 and the air A substantially remains entirely inside the bellows (as shown in FIG. 1). When the shaft is retracted inside the elongated body (actuator in the closed position), the air thrust by the closing of the coils of the bellows, moves into the sleeve that covers the elongated body, resulting in an increase in diameter of the second portion that detaches itself from the elongated body (as can be seen in FIG. 2). The fact that only two clamps determine the bond between the sleeve and the shaft ends and the cylinder allows the air placed inside the former element to move according to the degree of compression of the bellows portion. It is obvious that in the case where the elongated body 3 is not exactly a cylinder, but for instance, an elongated body having a polygonal cross section, the invention can be applied equally, making the part of the sleeve that is not a bellows, with the same shape as the elongated body, so that the sleeve adheres to the surface of the elongated body when the actuator is in the open position.

It is also clear that, in order to implement the invention, the sleeve must be made of a flexible and waterproof material.

What is claimed is:

1. A device for sealing an actuator comprising:
- an elongated body;
- a drive shaft in which the drive shaft and elongated body move relative to each other, along longitudinal axes thereof; and
- a sleeve which covers at least partially both the elongated body and the drive shaft, said sleeve having a first portion shaped as a bellows portion and a second portion having a shape like the elongated body so that the second portion is adapted to be fitted on the elongated body and blocked at one end thereat, the bellows portion being positioned in correspondence of the drive shaft and locked on the drive shaft at an opposite end of the sleeve so that the sleeve is integral with the shaft itself,
- wherein during movement of the actuator, the bellows is compressed or extended, and when the bellows is in an extended position, which corresponds to the actuator in an open position, the second portion of the sleeve substantially adheres to the elongated body and all air within the sleeve remains entirely inside the bellows portion, and when the shaft is retracted inside the cylinder, air thrust by closing of coils of the bellows portion moves into a rear part of the sleeve, resulting in an increase in diameter of the second portion, which detaches itself from the elongated body.

2. The device according to claim 1, wherein the elongated body is of cylindrical shape.

3. The device according to claim 1, further comprising a first clamp, which constrains the sleeve constrained to the elongated body, and a second clamp, which constrains the sleeve to the drive shaft.

4. The device according to claim 1, wherein the sleeve is made of a flexible and waterproof material.

* * * * *